July 24, 1934.  C. J. WARNKE  1,967,952
METHOD AND APPARATUS FOR TREATING GASES
Filed April 29, 1933
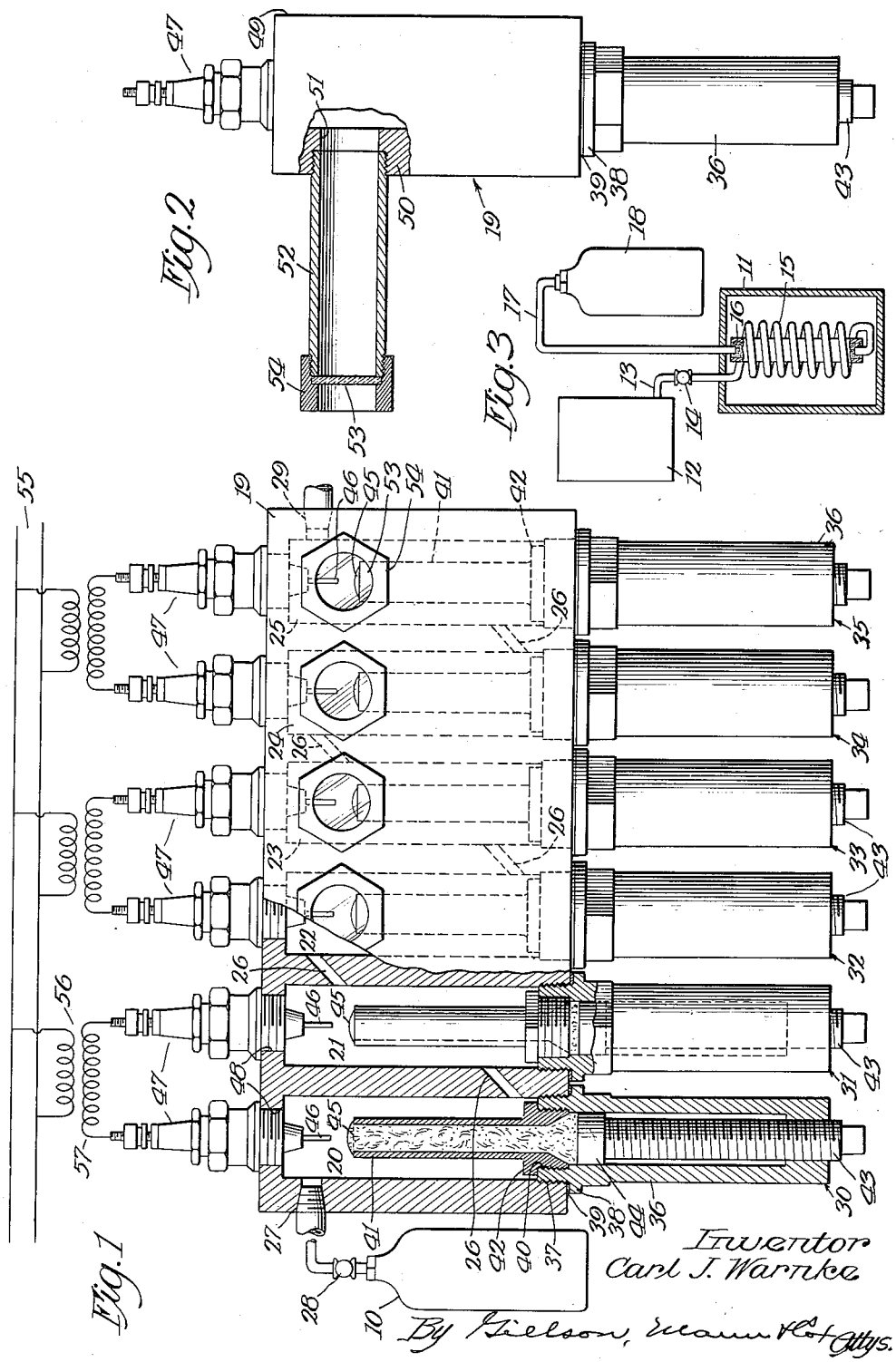

Patented July 24, 1934

1,967,952

UNITED STATES PATENT OFFICE 1,967,952

METHOD AND APPARATUS FOR TREATING GASES

Carl J. Warnke, Elkhart, Ind., assignor, by direct and mesne assignments, to The Adams & Westlake Company, Chicago, Ill., a corporation of Illinois Application April 29, 1933, Serial No. 668,495

9 Claims. (Cl. 23—204)

Stated broadly, the purpose of this invention is to provide an improved method and apparatus for purifying such gases as hydrogen, helium, neon, argon, krypton, xenon, and the like. It has been found that the so-called chemically pure commerical supplies of these gases contain small quantities of carbon-dioxide, water vapor, nitrogen, oxygen, hydrocarbons and other impurities which are highly undesirable. When purified by the method and apparatus of this invention, they are rendered substantially free of these impurities. In my copending application, Ser. No. 533,229, filed April 27, 1931, I have claimed the particular method and apparatus that is used for purifying hydrogen.

It is also an object of this invention to prepare certain gases which I have found to be particularly useful in mercury switches. These gases are more highly resistant to ionization than the gases now used, and are also substantially incapable of reacting with or being absorbed by such metals as platinum, tungsten, molybdenum, tantalum, and vanadium. Mercury switches employing these gases as gas fills are found to have amazingly long life, and vastly improved operating characteristics, and I have claimed the novel combination in a companion application, Ser. No. 668,496, filed April 29, 1933.

A still further object of the invention is to produce the hydrides of such elements as helium, neon, argon, silicon, and boron in stable form, at least in their own atmosphere, and of these I am particularly concerned with helium hydride. These hydrides appear to have certain properties that distinguish them from other gases and make them very useful.

The earlier textbooks will show that helium is commonly regarded as a typically inert gas, incapable of forming compounds. Numerous attempts have been made to combine helium with other elements, but for the most part, these attempts have met with failure. However, the investigations of certain scientists have tended to disprove that helium is completely inert and there is evidence that under particular circumstances helium can be made to combine with other elements to form compounds.

In Chemical Abstracts, vol. 23 (1929) p. 1537, there is a résumé of certain work performed by Horacio Damianovich with reference to the action of helium on platinum, and briefly it is related that by means of an electric discharge in a small tube, platinum was deposited in an atmosphere of spectroscopically pure helium. Upon examination of the deposit, it was found that absorption of the helium, amounting to from 14 to 34 cc. per gram of the platinum deposited, began with the appearance of the platinum deposit. When a deposit was finally decomposed in a vacuum at temperatures ranging from 90° C. to 160° C., the relation between the volume of helium evolved and the temperature resembled the decomposition relations of heterogeneous systems. Ultra-violet photomicrography indicated structural differences between the platinum-helium deposit and the platinum obtained after thermal decomposition. It was, therefore, proposed that the helium is held in some state of combination with a part of the platinum.

Again referring to the foregoing volume of the Chemical Abstracts, there is another reference to the work of the same party on pape 3382. There, it is stated that Damianovich made quantitative experiments illustrating the absorption or chemical combination of helium with platinum. One arrangement of his apparatus consisted of a discharge tube 20 centimeters long with two very pure platinum electrodes. Receiver tubes were inserted near the electrodes to catch the platinum-helium compound of brownish tinge. The other tube was built of quartz and had demountable electrodes.

In volume 20 of Chemical Abstracts, page 560, there is a reference to "mercury helide." It is stated that the correct analysis of this compound showed 21.079 parts by weight of mercury combined with 4.18 parts by weight of helium, giving the simplest formula as "$HgHe_{10}$". On page 2127 of the same volume, there is an affirmation of the analysis just given.

In the "Chemical Dictionary" by Hackh, published by C. Blackiston's Son & Co., Inc., Philadelphia, Pa., it is stated under the heading of "helium" that, while this substance has a valency of zero and hence forms no "ordinary compounds," excited helium molecules however seem to give compounds such as helides. In the same book, under the heading "helides," this substance is defined as being a "supposed compound of helium, as mercury helide $HgHe_{10}$".

In Nature, vol. 144 (1924) at page 861, there is the following statement which relates to the work of J. J. Manley of Magdalen College, Oxford:—

"* * * Under certain conditions and in the presence of an electric glow discharge, mercury and helium combine to form mercury helide. The helide is a stable compound, and is not readily decomposed except at or above a bright red heat. As the formation of the helide progresses, a corresponding decrease in the volume of the helium employed takes place. On heating the mixed gases (helium and helide) to the required temperature, the original volume of the helium is restored. The helide is but slightly absorbed by charcoal cooled in liquid air."

In Engineering, vol. 121 (1926), at page 459, there is an account of experiments made by Aston with gases of the helium group. The experiments showed that under special conditions, the helium group of gases were capable of forming temporary compounds presumably the hydrides. By spectrum analysis, Aston found a line in one of his discharge tubes which corresponded to an atomic weight of five and which he concluded to be a hydride of helium. These hydrides, however, were all of temporary character.

Through extensive research, I have devised a method and apparatus for producing a gas which appears to be a stable form of helium hydride. Its characteristics are not the same as when helium and hydrogen are mixed without any attempt to have them chemically combined, but on the contrary, the new gas exhibits the properties which would be expected of the hydride of helium.

Perhaps the most common way to identify unknown gaseous substances is by spectrum analysis. In order to prove that the gas produced by my method and apparatus is more than a physical mixture of helium and hydrogen, tests were conducted to show that the gaseous product of my method and apparatus emits a band of light waves that is foreign to the spectra of helium, hydrogen and the physical mixture of helium and hydrogen. When chemically pure helium is excited in a Geissler tube, the characteristic spectrum of helium is produced. Likewise when chemically pure hydrogen is excited in a Geissler tube, the characteristic spectrum lines of hydrogen are produced. When the physical mixture of helium and hydrogen are analyzed by the spectroscope, the spectrum is the sum of the helium and hydrogen spectra. But when the gaseous product of my method and apparatus is spectroscopically analyzed, an intense and highly persistent line at 5440 angstroms is seen, which line does not occur in the helium or hydrogen spectra or in the spectrum of the physical mixture of helium and hydrogen. This new line at 5440 angstroms indicates, without a doubt, that the helium and hydrogen have combined in some way, and there is reason to believe that the new combination has a probable formula HeH.

Another test which strongly indicates the formation of helium hydride is known as the absorption test. Hydrogen is well known to be capable of being absorbed by such metals as platinum, tantalum, columbium and palladium. With tantalum, hydrogen is capable of being absorbed to the extent of four to nine hundred times the volume of the metal. The ability of these metals to absorb hydrogen is increased as the temperature of the metal is raised. Thus when a quartz tube containing tantulum is heated to a temperature of 1000° C. and a source of hydrogen is connected to the tube, the hydrogen will flow into the quartz tube at an amazing rate. This can be measured by a suitable flow meter.

Helium is unlike hydrogen in this respect, and is substantially incapable of being absorbed by heated tantalum. Therefore, if a physical mixture of equal volumes of helium and hydrogen is passed into the tube containing hot tantalum, the flow will be substantially one-half of the flow which was recorded for hydrogen alone. But when a physical mixture of helium and hydrogen has been first passed through my apparatus to form helium hydride in accordance with the method disclosed in this application, and then introduced into the quartz tube containing tantalum, we find that the flow of gas is practically nil. This test, therefore, strongly indicates that the helium and hydrogen have combined in some manner and are no longer free elements.

While I firmly believe that helium hydride is formed in a stable state by my method and apparatus, the gaseous product, whatever it is, has many properties which distinguish it from known gases and make it highly useful. The method and apparatus of this invention, therefore, has utility regardless of the chemical composition of the gas that is formed.

Further and other objects and advantages will become apparent as the disclosure proceeds and the description is read in conjunction with the accompanying drawing, in which Fig. 1 is a side, elevational view of apparatus for practicing my method of treating gases, the parts being broken away to expose the interior of the apparatus;

Fig. 2 is a side, elevational view of the apparatus, a portion of the apparatus being shown in section; and Fig. 3 is a semi-diagrammatic view showing an optional preliminary step to my process.

For the purpose of this disclosure, it will be assumed that the container 10 is filled with a physical mixture of helium and hydrogen in the proportion of two volumes of helium for one of hydrogen. If the apparatus is to be used merely for purifying the gas, the container 10 is exchanged for another which contains the gas to be treated. Reference is made to my copending application, Ser. No. 533,229 filed April 27, 1931 for a specific use of the method and apparatus of this invention for purifying hydrogen.

Before physically mixing the helium and hydrogen in the container 10, the two gases may be separately or jointly conducted through a hermetically sealed box 11 into which liquid air is adapted to be introduced. The source of helium, hydrogen, or helium and hydrogen is indicated diagrammatically at 12 and the gas is led from the source through a tube 13 and valve 14 to a coil 15 in the box 11. The bottom end of the coil communicates axially with the interior of a cylindrical filter element 16 which is filled with cotton or other filtering material, in order to prevent impurities which are frozen out of the gas from passing through the pipe 17 into the container 18. In this way, the greater part of the moisture and other impurities which will freeze at the temperature obtainable with liquid air are removed from the gas.

It will be understood that the apparatus shown in Fig. 3 is purely diagrammatic and that any suitable means may be provided for freezing out the grosser quantities of impurities.

My apparatus, as shown in Fig. 1, consists essentially of a steel block 19 substantially rectangular in form and provided with a plurality of gas chambers 20, 21, 22, 23, 24 and 25, all of which are open at the bottom. The chambers are connected in series by inclined passages 26 and preferably the passages 26 are alternately arranged adjacent the top and bottom of the block.

The end of the block adjacent to the chamber 20 has an inlet opening 27 for introducing the gas into the apparatus from the container 10. A valve 28 is provided for regulating the flow of gas from the container and it is obvious that the gas when introduced into the apparatus passes successively through chambers 20, 21, 22, 23, 24 and 25 and finally emerges from the apparatus through an opening 29.

The bottoms of the chambers are closed by electrode holders generally designated 30, 31, 32, 33, 34 and 35, each of which consists of a tubular shell 36 which is threaded at 37 into the base of the block and is provided with a flange 38 which forms a seat for a gasket 39 so as to hermetically seal the interior of the chamber.

The upper ends of the shells 36 are internally threaded as shown at 40 to receive the threaded bases of sleeves 41 which extend upwardly a substantial distance along the vertical axes of the chambers. The sleeves are provided with flanges 42 which rest upon the tops of the shells 36.

Each shell is provided with a threaded stem 43 which is threaded into the base of the shell and is equipped with a cylindrical head 44 the diameter of which is the same as the internal diameter of the shells 36.

In each of the six chambers in the block, electrodes are provided for setting up an electric arc in order to excite the gases which are passing through the apparatus. In the present embodiment of the invention, one of the electrodes is of molybdenum, or tungsten, or any other suitable refractory metal, and the other is composed of one or more metals chosen from a group consisting of sodium, potassium, calcium, black phosphorous, magnesium, cæsium, titanium, and other metals which, because of their ability to decompose and/or take up water vapor at elevated temperatures, and their ability to retain it and/or prevent its reformation at lower temperatures, may be called equivalents. The particular metal or metals that are used depend upon the use to which the apparatus is put, but in all cases, the material forming one of the electrodes must be capable of ionizing to effect a precipitation of impurities from the gases and perhaps assist as a catalyst in effecting the desired result.

The upper refractory electrodes 46 are mounted in specially constructed plugs 47 in which the customary side electrode is omitted. The plugs may be screwed into suitable openings 48 provided in the top of the block, or they may be mounted horizontally in the rear wall 49. There is some advantage in this latter arrangement, because the plugs are slightly removed from the tops of the chambers where the temperature is the highest.

The lower or vaporizing electrodes 45, being relatively soft, may be extruded through the sleeve 41 by turning the stems 43 in the shells. In order that the functioning of the apparatus may at all times be observed, the front wall 50 of the block is provided with openings 51 into which steel tubes 52 are threaded carrying a window 53 at their outer ends secured in place by suitable nuts 54. These windows permit the person using the apparatus to at all times observe the functioning of the apparatus and adjust the lower electrodes 45 when necessary.

The potential for striking the arc between the electrodes 46 and 45 is supplied from a power line 55 having a plurality of step-up transformers 56 connected across the line. The secondary coils 57 of the transformers are connected to the binding posts of adjacent plugs 47 so as to form three high potential circuits in the block. Thus the electrical circuit for chambers 20 and 21 may be traced from the coil 57 through the plug 47 in the chamber 20, thence through the electrode 45 in the chamber 20, thence through the block 19 to the electrode 45 in the chamber 21; thence to the electrode 46 in the plug of that chamber, and back to the secondary coil 57.

For best results, the high potential circuits through the electrodes should operate at or about 12,000 volts and 200 milliamperes.

It will be understood that the use of six separate chambers in the block 19 is but an arbitrary arrangement and that a fewer number, or more, may be employed.

As has been before intimated, the material used for the electrode 45 is of prime importance to the successful employment of my method and apparatus. It is not definitely known whether the electrode material acts as a catalyst or merely becomes more active because of being ionized under the electric arc. The discussion that follows, therefore, is merely explanatory of what is thought to occur when particular materials are used. Entirely apart from the theoretical explanation remains the fact that when these materials are used, a new and useful product is formed.

Sodium, potassium, calcium, black phosphorous, magnesium, cæsium, and titanium are all more or less hygroscopic in character and when in ionized form under an electric arc have the inherent capacity to unite with water vapor to form solids which are precipitated from the gas. These metals also react with carbon dioxide and certain other impurities to remove them from the gas.

It will be understood that the term "hygroscopic" as it is used throughout this disclosure and in the appended claims is intended to signify that the metals are capable of decomposing, uniting with, or otherwise taking up water vapor at elevated temperatures, and moreover are capable of tenaciously holding onto the water vapor, and/or preventing water vapor from forming by a recombination of hydrogen and oxygen when the temperatures are lowered to normal. Therefore, any metal having this property may be considered the equivalent of the named metals unless the prior art forbids this interpretation.

Since sodium is one of the most active of the metals in the above group, and can be obtained commercially in a highly purified state, I prefer to use it as the lower electrode in the first three chambers, i. e. chambers 20, 21 and 22. The other metals could, of course, be used if desired.

Although sodium can be obtained in a highly purified state, I prefer to further purify it by melting it under vacuum in a container immersed in an oil bath at a temperature of about 350° C. The impurities in the sodium will rise to the surface and when the entire mass is cooled, the impurities may be cut from the pure sodium.

Since pure sodium is relatively soft at ordinary temperatures, it can be forced through the sleeve 41 with ease by suitable manipulation of the stem 43.

The other three vaporizing electrodes may also be sodium, but preferably they contain some titanium, or calcium because these metals are better able to combine with nitrogen impurities and remove them from the gas. The calcium and titanium also seem to act as catalysts when the apparatus is being used to form gaseous hydrides, and are, therefore, particularly desirable when the apparatus is put to this use. However, it will be understood that calcium and titanium merely increase the hydride yield and do not appear to be essential to its formation.

As between calcium and titanium, the latter appears to be the better catalyst. The last three vaporizing electrodes are, therefore, preferably composed of a mixture of chemically pure sodium mixed with some titanium. The mixture may be made while the sodium is being purified by placing powdered titanium with the sodium prior to its being melted under vacuum.

When a physical mixture of helium and hydrogen is passed through the apparatus and subjected to the action of the electric arcs in the presence of ionized hygroscopic metals and particularly in the presence of titanium, or calcium ions, the gas which issues from the outlet 29 is characterized by its amazing di-electric properties and its relative inability as compared with hydrogen to react with or be absorbed by tantalum. It has an ionizing potential substantially above hydrogen or helium, and consequently is far more effective in suppressing electric arcs than either of these gases alone.

From the above, it will be understood that when the apparatus is to be used for purification purposes, the vaporizing electrodes are made of any of the hygroscopic materials, and preferably sodium. If the gas to be purified contains nitrogen, as an impurity, some calcium or titanium should be used in the vaporizing electrodes.

When the apparatus is to be used for effecting a chemical combination of hydrogen with helium or some other element or to produce a gas having the particular characteristics that are desirable for use in mercury switches, one or more of the vaporizing electrodes should contain calcium and/or titanium, and preferably the latter in order to obtain a good yield of the desired gas.

It will be understood that so far as the method is concerned the necessary hygroscopic and catalytic ions may be introduced into the electric arc by some means other than forming the electrodes of the desired material. For example, the hygroscopic and catalytic materials could be placed in the path of the electric discharge without making them a part of the electrical circuit.

A slightly different apparatus must be used to form boron and silicon hydride by the method of this invention. Since both boron and silicon are solids, they cannot be physically mixed with hydrogen prior to their being introduced into the apparatus. It is, therefore, necessary to ionize the boron and silicon in the apparatus and this can be accomplished either by using boron and silicon as constituents of the vaporizing electrodes or they may be placed in the path of the electrical discharge without being made a part of the electrical circuit. When boron and silicon are used as electrode material, it is undesirable to use the more active hygroscopic metals in the same apparatus, as they react unfavorably with the ionic constituents of the arc. In practice, therefore, the hydrogen is first passed through the apparatus in the regular manner to render it substantially free of impurities, and the purified hydrogen is then put through an electric arc in which the electrodes are of boron or silicon according to the hydride which it is desired to form. One of the electrodes may be of mercury or gallium, as these metals are capable of withstanding the high temperatures which prevail in the boron and silicon arc. Mercury and gallium, of course, vaporize under the intense heat, but condense again when cooled.

All of the gaseous hydrides formed by my method and apparatus are stable compounds at least in their own atmosphere. This is proven by the fact that mercury switches using the hydrides as gas fills are infinitely more enduring than switches using the uncombined gases.

It will be understood that the solids precipitated in the apparatus by the hygroscopic metals may be removed by connecting the outlet 29 to a filter of any desired construction, preferably, however, using cotton as the filtering medium.

What I claim, therefore, is:—

1. The method of preparing a gas that is characterized by its superior arc suppressing properties, as compared with hydrogen, and its relative inability, also as compared with hydrogen, to react with or be absorbed by tantalum, said method consisting in subjecting substantial quantities of hydrogen and some gas taken from a group consisting of helium, neon and argon, to the action of an electric arc in the presence of ionized hygroscopic metals.

2. The method of preparing a gas that is characterized by its superior arc suppressing properties, as compared with hydrogen, and its relative inability, also as compared with hydrogen, to react with or be absorbed by tantalum, said method consisting in subjecting substantial quantities of hydrogen and some gas taken from a group consisting of helium, neon and argon to the action of an electric arc in the presence of an ionized hygroscopic metal and titanium ions.

3. The method of preparing a gas that is characterized by its superior arc suppressing properties, as compared with hydrogen, and its relative inability, also as compared with hydrogen, to react with or be absorbed by tantalum, said method consisting in subjecting a mixture of helium and hydrogen in the approximate proportion of two volumes of helium to one of hydrogen to the action of an electric arc in the presence of ionized metals chosen from a group comprising sodium, potassium, calcium, black phosphorous, magnesium, cæsium and titanium.

4. The method of preparing a gas that is characterized by its superior arc suppressing properties, as compared with hydrogen, and its relative inability, also as compared with hydrogen, to react with or be absorbed by tantalum, said method consisting in subjecting a mixture of substantial quantities of helium and hydrogen to the action of an electric arc in which one of the electrodes is composed of a mixture of substantially pure sodium and titanium.

5. The method of chemically uniting helium and hydrogen to form a hydride which consists in subjecting a mixture of the two gases to the action of an electric arc in the presence of sodium and titanium ions.

6. The method of chemically uniting helium and substantial quantities of hydrogen to form a hydride which consists in subjecting a mixture of the two gases to the action of an electric arc in the presence of ionized hygroscopic metals.

7. The method of forming helium hydride which consists in passing a mixture of helium and hydrogen through a series of electric arcs in which strong hygroscopic metals are ionic constituents of one arc and calcium or titanium are ionic constituents of the succeeding arc.

8. The gaseous product formed by passing a mixture of hydrogen and helium through an electric arc in the presence of ionized hygroscopic metals, and having a probable formula of HeH.

9. Helium hydride in stable form.

CARL J. WARNKE.